P. & C. R. DOSCH.
CASTER OR WHEEL.
APPLICATION FILED JAN. 19, 1915.
1,162,145.
Patented Nov. 30, 1915.
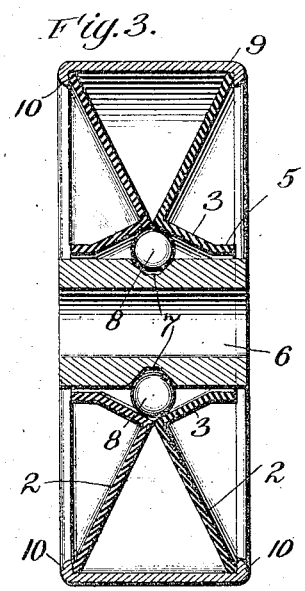
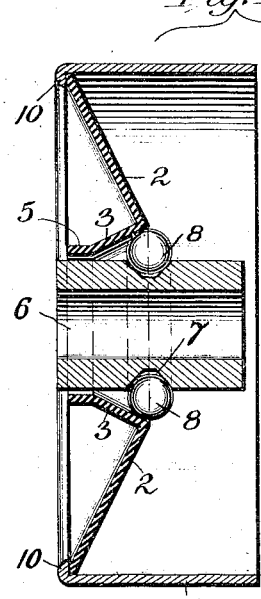
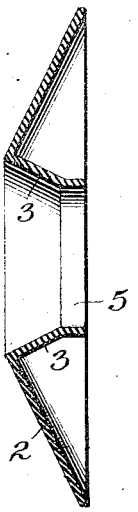
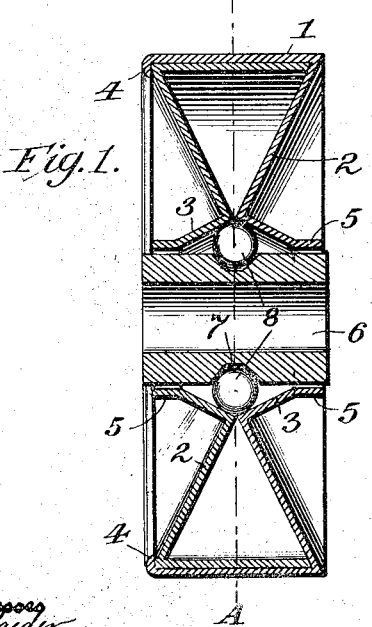
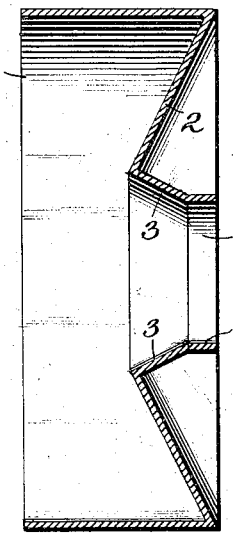
Inventors
Peter Dosch
Charles R. Dosch,

UNITED STATES PATENT OFFICE.

PETER DOSCH AND CHARLES R. DOSCH, OF STRATFORD, CONNECTICUT.

CASTER OR WHEEL.

1,162,145.  Specification of Letters Patent.  Patented Nov. 30, 1915.

Application filed January 19, 1915. Serial No. 3,105.

*To all whom it may concern:*

Be it known that we, PETER DOSCH and CHARLES R. DOSCH, citizens of the United States, residing at Stratford, in the county of Fairfield and State of Connecticut, have invented certain new and useful Improvements in Casters or Wheels, of which the following is a specification.

This invention pertains to an improvement in casters or wheels, the construction and advantages of which will be hereinafter set forth, reference being had to the annexed drawings, wherein:

Figure 1 is a sectional view of the wheel, taken on a plane coincident with its axis; Fig. 2 a sectional view of one of the body members employed in this construction; Fig. 3 a sectional view of a modified construction of the wheel, taken on a plane coincident with its axis; and Fig. 4 a similar view, showing one of the body members separately and prior to its being positioned with reference to the other members.

The main object of the present invention is to produce a wheel simple in construction and embodying few pieces or parts, which may be readily assembled, and that without the use of any separate fastening means or devices.

A further object is to so form the parts that they tend to mutually brace and sustain each other, the construction being such that there is no tendency for the parts to spread or yield under weight or strain, but on the contrary the greater the pressure (short, of course, of breaking strain or pressure) the more the parts tend to mutually brace each other and maintain the integrity of the wheel as a whole.

In the drawings, having reference first to the construction shown in Figs. 1 and 2, it will be noted that the body and tire are composed of two members, substantially alike in form and each comprising a tire or rim section 1, a main body portion 2, and a race or ball-bearing portion 3. The tire section of one member is slightly greater in width than the other, as is clearly evident upon an inspection of Fig. 1, in order that when the parts are assembled said larger section or outside portion of the member 1 may be turned downwardly to form a flange 4 to embrace and hold the parts together at the peripheral or tire portion of the wheel. The member 2 extends inwardly from the tire section 1 and the bearing portion 3 is inclined in the opposite direction, a cylindrical portion 5 extending outwardly from said member 3. Stated in another way, the body of the wheel may be said to comprise a tire section, a relatively large, truncated cone shaped member 2, and a smaller truncated cone shaped member 3, the walls of said conical sections inclining and extending in reverse directions, with the base of the smaller coincident with the top of the larger cone. As will be seen, these body sections are each formed from a single piece of metal, preferably struck up in a die-press. 6 denotes the hub, which is provided upon its exterior with an annular ball-race 7, the center of the race being coincident with a plane A—A which passes centrally through the tire at right angles to the axis thereof. A series of balls 8, are seated in the race, and bear upon the inner faces of the cone-shaped members 3. The body members are duplicates of each other, except for the fact that the tire section 1 of one member is slightly wider than that of the other, and said body members stand in a reverse position to each other with reference to the wheel as a whole, the main body sections 2 converging and in fact contacting at their inner margins in the plane A—A hereinbefore referred to. The inner faces thereof contact with the balls 8, and the angularity of such faces is such that any pressure applied thereto tends to force the body portions inwardly toward each other, thereby offsetting any tendency to spread and doing away with the necessity of any connection between the body sections or members. The arrangement of the parts is such that the line of thrust of each ball against the race portion of the side members falls between the points of engagement of said side members, and the tire or rim. Stated in another manner, it may be said that the ball-race portions 3 are so located relatively to the line of engagement of the rim member and the corresponding side member, as to convert the thrust of the balls against said race into turning moments about the point of engagement of the side member with the rim member, and tending to force said side members toward each other. This is assuming that the point of junction between the members 1 and 2 is a point of engagement, and that there would be a tendency for the member 2 to turn with reference to the tire 1 at said point of junction.

In Figs. 3 and 4 a construction is shown wherein, instead of employing tire-portions formed integrally with the side members, a separate tire member 9 is used, said tire member having inwardly-projecting flanges 10, which coact with the side plates or body members, and prevent the same from being displaced laterally at such point. This construction otherwise is identical with that previously described, and the corresponding parts are similarly lettered.

As above noted, the line of thrust of each ball against the race portion of the cone members falls between the points of engagement of the side members and rim member.

In actual practice under both constructions it is found that there is no tendency whatsoever for the body or side plates to spread under strain or stress, but on the contrary the balls serve to force the parts inwardly toward each other and to bring the members into contact with each other at the junction of the truncated cone sections.

It will be understood, of course, that in so far as the generic invention is concerned, a hub having an independently-positioned ball-race thereon may be employed, and that the invention is not confined to the use of a hub having the race formed in the body thereof.

The cylindrical portion 5 may be omitted, but its presence is preferred as it tends to strengthen the structure and serves to incase the hub to a greater or less degree. So, too, the members 3 may not be true cones but may be conoidal in outline, without departing from the spirit of the invention.

Having thus described our invention, what we claim is:

1. A bearing structure, comprising in combination a journal member provided with a ball race; a plurality of bearing balls mounted in said race; a pair of annular side members each having a conoidal ball race portion and a load-transmitting web portion; and a tire serving to hold said side members together, the balls, side members and tire being so formed and proportioned that the line of thrust of each ball against the race portion of the side members falls between the points of engagement of the side members and tire.

2. A wheel structure for use with ball bearings, comprising in combination a tire, and a pair of side members held thereby, each of said side members being formed with a ball-race portion, said ball-race portions being so located, relatively to the line of engagement of the tire and the corresponding side member, as to convert the thrust of the balls against said race portions into turning moments about the point of engagement of the side member with the tire, tending to force said side members toward each other.

3. A roller comprising a hub or journal member provided with a ball-race; a plurality of bearing balls mounted in said race; and a pair of annular side members, each having a conoidal ball-race portion, a load-transmitting web portion, and an annular tire or rim member, said members, when the parts are assembled, overlapping and adapted to be secured to each other, the balls, side members and tire being so formed and proportioned that the line of thrust of each ball against the race portions of the side members falls between the points of engagement of the side members and the rim.

4. A roller, comprising a hub having an exterior annular ball race; a tire; a pair of reversely disposed body members, each comprising a relatively large truncated cone-shaped member upon which the tire is mounted, and a smaller, centrally-disposed and reversely directed cone-shaped member, the inner faces of the latter oppositely-disposed cones standing at an obtuse angle to each other; and a plurality of balls mounted in the race and bearing upon the inner cone faces and tending to move the centrally-disposed cone-shaped members toward each other.

5. A roller, comprising a hub having an exteriorly formed ball-race; a series of balls resting therein; a tire; and a pair of body members interposed between the tire and the balls, said members converging toward each other as they approach the axis of the roller, each body member carrying a bearing member contacting with the balls, the angle of the bearing members being such as to cause the body members to seek to move inwardly toward each other under strain applied to the wheel.

6. A roller comprising a hub having an exteriorly formed annular ball-race; a tire; a pair of inwardly-converging disk-like body members having centrally-disposed, outwardly-extending bearing members, said body members bearing at their periphery upon the tire; and a series of balls placed in the race and contacting with said bearing members, the angular position of such bearing members being such as to tend to rock the body members inwardly toward each other at their adjacent central portions.

In testimony whereof we have signed our names to this specification in the presence of two subscribing witnesses.

PETER DOSCH.
CHARLES R. DOSCH.

Witnesses:
F. W. SMITH, Jr.
M. T. LONGDEN.